United States Patent [19]

Hunt

[11] 4,452,771

[45] Jun. 5, 1984

[54] CARBON PARTICLES

[75] Inventor: Arlon J. Hunt, Oakland, Calif.

[73] Assignee: The United States of America as represented by the United States Department of Energy, Washington, D.C.

[21] Appl. No.: 426,369

[22] Filed: Sep. 29, 1982

[51] Int. Cl.$^3$ .................... C01B 31/02; C09C 1/48
[52] U.S. Cl. .................... 423/450; 423/449; 423/458
[58] Field of Search ............... 422/150, 158; 423/448, 423/449, 450, 458, 456, 451, 445

[56] References Cited

U.S. PATENT DOCUMENTS

| | | | |
|---|---|---|---|
| 986,489 | 3/1911 | Morehead | 423/458 |
| 1,669,618 | 5/1928 | Lewis | 423/458 |
| 1,758,152 | 5/1930 | Goodwin | 423/458 |
| 2,121,463 | 6/1938 | Wisdon | 423/458 |
| 2,773,744 | 12/1956 | Antonsen | 423/458 |
| 3,288,696 | 11/1966 | Orbach | 423/450 X |
| 3,409,403 | 11/1968 | Bjornson et al. | 423/450 |
| 4,013,759 | 3/1977 | Giet | 423/445 |
| 4,279,880 | 7/1981 | Giet | 423/445 |
| 4,313,304 | 2/1982 | Hunt | 60/641.8 |

FOREIGN PATENT DOCUMENTS 453032 11/1948 Canada .................... 423/458

OTHER PUBLICATIONS

Hunt et al., The Design and Construction of a High Temperature Gas Receiver Utilizing Small Particles As the Heat Exchanger, 9-1982.

Primary Examiner—Gregory A. Heller
Attorney, Agent, or Firm—L. E. Carnahan; Roger S. Gaither; Michael F. Esposito

[57] ABSTRACT

A method and apparatus whereby small carbon particles are made by pyrolysis of a mixture of acetylene carried in argon. The mixture is injected through a nozzle into a heated tube. A small amount of air is added to the mixture. In order to prevent carbon build-up at the nozzle, the nozzle tip is externally cooled. The tube is also elongated sufficiently to assure efficient pyrolysis at the desired flow rates. A key feature of the method is that the acetylene and argon, for example, are premixed in a dilute ratio, and such mixture is injected while cool to minimize the agglomeration of the particles, which produces carbon particles with desired optical properties for use as a solar radiant heat absorber.

7 Claims, 3 Drawing Figures

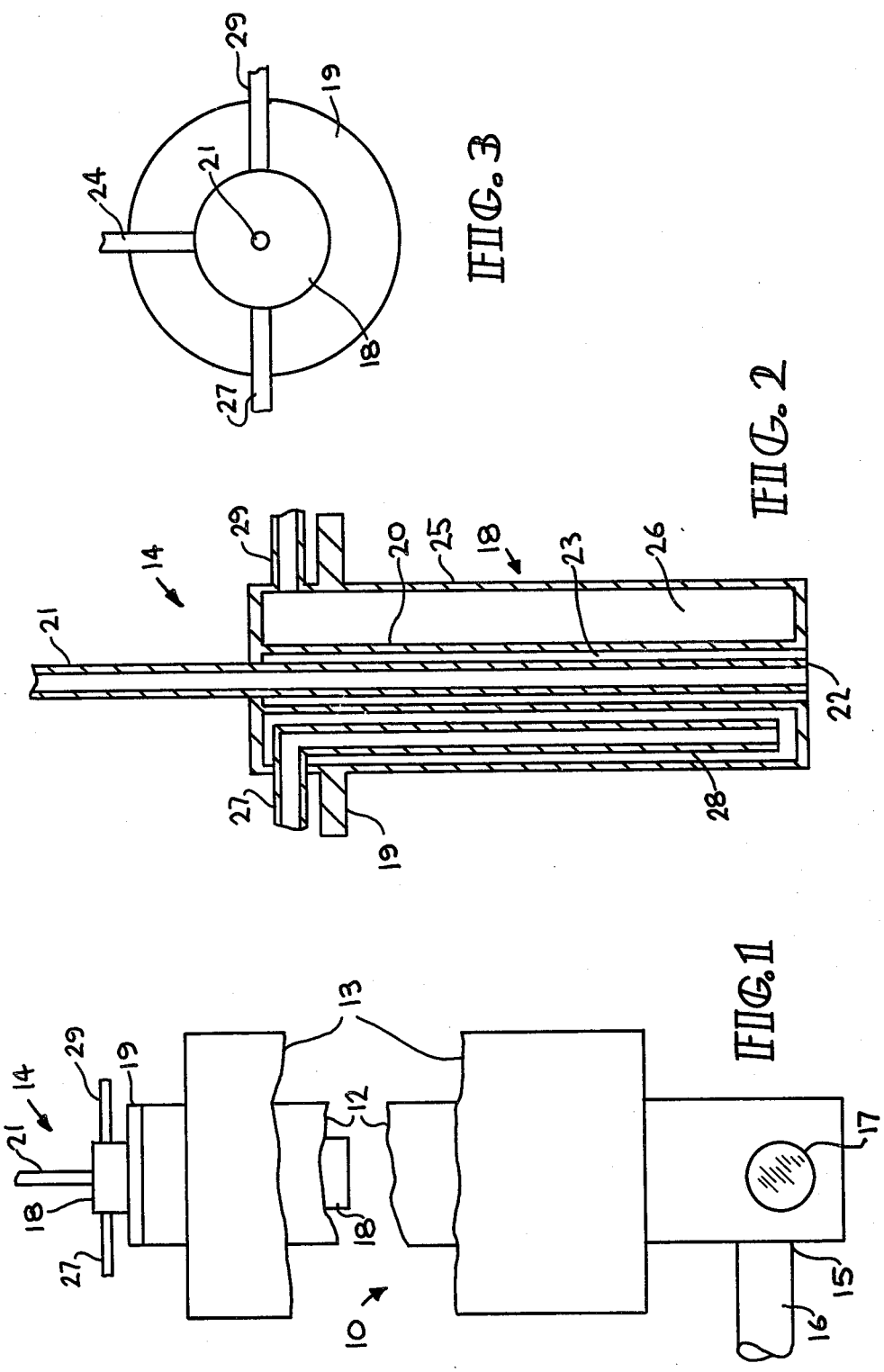

CARBON PARTICLES

BACKGROUND OF THE INVENTION

The invention described herein arose at the Lawrence Berkeley Laboratory in the course of, or under, Contract No. W-7405-ENG-48 (now No. DE-AC03-76SF00098) between the U.S. Department of Energy and the University of California.

The invention relates to the production of carbon particles, more particularly to the production of small carbon particles by pyrolysis of a hydrocarbon and carrier gas, and more particularly to a method and apparatus for producing small carbon particles having proper optical properties to act as a solar radiant heat absorber.

Carbon particles have been produced by numerous well-known methods. These widely known methods include the use of high intensity arcs, thermal decomposition of hydrocarbons or carbon monoxide, and high temperature pyrolysis of organic resins. The high intensity arc has been established as a method for industrial production of sub-micron particles. Carbon, metals, semi-conductors and many other oxides have been produced at rates of kilograms to tens of kilograms per hour using a single arc. Carbon blacks known as channel blacks have been produced chemically since 1872 by thermal decomposition by a quenching procedure known as the channel process. Various other carbon blacks are produced by different processes for thermally decomposing hydrocarbons. The properties of these blacks vary widely, but they tend to be symmetrical in shape and to have particle diameters ranging from 0.01 to 0.5 micrometers. High temperature pyrolysis is used to produce vitreous carbon that has extremely high decomposition temperatures in air. Further discussion of these three known methods can be found in the following sources. The high intensity arcs are discussed by J. D. Holmgren et al at p. 129 of "Ultrafine Particles" (1963), W. E. Kuhn Ed., John Wiley and Sons, Inc., New York. The thermal decomposition of hydrocarbons is discussed by P. L. Walker, Jr., p. 297 of above-referenced "Ultrafine Particles". The high temperature pyrolysis is discussed by J. S. Nadeau in the 57th volume of the Journal of the American Ceramic Society, pp. 303 to 306.

In addition to the above widely known methods of producing carbon particles or carbon blacks, various apparatus have been developed for carrying out different production approaches. The prior known apparatus is exemplified by the following U.S. Pat. No. 986,489 issued Mar. 14, 1911; U.S. Pat. No. 1,669,618 issued May 15, 1928; U.S. Pat. No. 1,758,152 issued May 13, 1930; U.S. Pat. No. 2,121,463 issued June 21, 1938; U.S. Pat. No. 2,773,744 issued Dec. 11, 1956; U.S. Pat. No. 4,013,759 issued Mar. 22, 1977; and U.S. Pat. No. 4,279,880 issued July 21, 1981.

The above-referenced patents primarily involve the production of carbon particles by pyrolysis (chemical decomposition by heat) of a hydrocarbon, such as acetylene and a carrier gas. Of these referenced U.S. Pat. Nos. 2,121,463 and 4,013,759 are concerned with an injection nozzle arrangement for more effective operation of the process carried out thereby.

It is also widely recognized that the disbursement of many premanufactured powders is extremely difficult due to the tendency of these small particles to agglomerate. Such disbursement must overcome the large surface forces that hold the particles together. Thus, it has been recognized that the best way to produce certain types of carbon particles is to generate them at the site or point of use by one of the above-indicated methods, entrain the particles in a gas steam, and conduct them to the receiver thereof for the intended use, thus minimizing the chances of agglomeration.

More recently, it has been discovered that carbon particles with proper optical properties are very effective as a solar radiant heat absorber, and thus can be utilized in solar power generation apparatus. U.S. Pat. No. 4,313,304 issued Feb. 2, 1982 to A. J. Hunt describes and claims a method and apparatus for producing power from solar radiation flux wherein radiant energy absorbent vaporizable particles in a fluid stream are utilized to heat the fluid. In such solar power generation apparatus, it has been found that carbon particles can rapidly absorb radiant energy as they have a large surface area in comparison to their volume, and thus transfer their heat to the surrounding fluid stream. Accordingly, the temperature difference between the particles and the fluid stream is small, resulting in a high thermal efficiency.

A problem associated with the use of carbon particles in solar power generating apparatus is the minimizing of the above-referenced agglomeration of the particles so as to provide even disbursement of the particles in the entraining fluid stream to provide uniform heating of the fluid. While the prior apparatus and methods have been effective for producing small carbon particles having diameters ranging from 0.01 to 0.5 micrometers, the size utilized in the power generating apparatus of the above-referenced U.S. Pat. No. 4,313,304, a need has existed for a method and apparatus capable of rapidly producing this size carbon particles while minimizing the agglomeration of the particles.

SUMMARY OF THE INVENTION

The method and apparatus of the present invention overcome the above-referenced disbursement problems associated with the prior known carbon particle production approaches due to the agglomeration of the particles. This is accomplished by producing small carbon particles (ranging from 0.01–0.5 micrometers in diameter) by the pyrolysis of a mixture of a hydrocarbon and a carrier gas in a manner so as to minimize the agglomeration of the the particles.

Therefore, it is an object of this invention to provide a method and apparatus for generating small carbon particles.

A further object of the invention is to provide a method and apparatus for producing carbon particles with the proper optical properties to act as solar radiant heat absorbers.

A still further object of the invention is to provide a method and apparatus for rapidly producing small carbon particles while minimizing the agglomeration of the particles.

Another object of the invention is to provide a process of generating small carbon particles by pyrolysis of a mixture of a hydrocarbon and carrier gas wherein the mixture is injected while cool into a heated chamber.

Another object of the invention is to provide an apparatus for generating small carbon particles which includes means for directing a mixture of a hydrocarbon, such as acetylene, in a carrier gas, such as argon, through a cooled nozzle, while adding air to the mixture, into an elongated heated tube to assure efficient pyrolysis of the acetylene carried in the argon, while minimizing agglomeration of the particles.

Other objects of the invention will become apparent to those skilled in the art from the following description and accompanying drawings.

The above objects are carried out by the generation of small carbon particles (0.01 to 0.5 micrometer diameters) by pyrolysis of a mixture of acetylene carried in argon, wherein same are premixed in a dilute ratio, and such mixture is injected while cool into a heated chamber wherein the pyrolysis process is carried out, such that agglomeration of the particles is minimized.

The apparatus for carrying out the carbon particle generating method includes means for mixing a hydrocarbon, such as acetylene, in a carrier gas, such as argon, while adding air to the mixture, if desired, and injecting the mixture while cool into an elongated heated chamber through a cooled nozzle, whereby carbon build-up at the nozzle is prevented and agglomeration of the particles is minimized.

The invention is capable of rapidly producing carbon particles with the proper optical properties for suspension in a working fluid to act as solar radiant heat absorbers for heating the working fluid.

BRIEF DESCRIPTION OF THE DRAWINGS

FIG. 1 is a fragmentary elevational view of a particle generator constructed according to the invention;

FIG. 2 is an enlarged, sectional view of an embodiment of the injector assembly of the FIG. 1 generator; and FIG. 3 is a top view of the FIG. 2 injector.

DETAILED DESCRIPTION OF THE INVENTION

The present invention is directed to an apparatus and process for producing small carbon particles with minimal agglomeration by the pyrolysis of a mixture of a hydrocarbon and a carrier gas which is injected, while cool, through an externally cooled nozzle into one end of an elongated tube. A small amount of air may also be added to the mixture. The cooled nozzle prevents carbon build-up at the tip thereof. The heated tube is elongated sufficiently to assure efficient pyrolysis at the desired flow rates.

The carbon particles (ranging in diameter of 0.01–0.5 micrometers) produced by the method and apparatus of this invention have the proper optical properties when suspended in a working fluid to act as solar radiant heat absorbers for solar power generating mechanisms, such as in the above-referenced U.S. Pat. No. 4,313,304.

The particle generating apparatus and generation process of the present invention differs from any prior known apparatus and process by minimizing agglomeration of the particles, which is accomplished primarily by mixing the hydrocarbon and carrier gas prior to injection in a heated chamber for pyrolysis, the mixture being injected cool. This enables the production of particles having desired optical properties for use as solar radiant heat absorbers and minimizes the agglomeration of the particles which allows for efficient and uniform particle suspension in a working fluid being subjected to radiant heating.

Referring now to the drawings, particularly to FIG. 1, there is shown a particle generator, generally indicated at 10, and basically comprising an elongated reaction tube 12 forming therein a heating chamber, a controlled heating unit 13 surrounding tube 12, and an injector assembly generally indicated at 14 attached to tube 12 at its upper end. Heating unit 13 may, for example, be of the electronic or electric coil type. Thus, tube 12 receives material from the lower end of injector assembly 14, as more fully explained hereinafter, and directs the material downward through a heated zone or chamber therein which is surrounded by heating unit 13, and out through an outlet 15 in the lower end of tube 12 which is connected to a particle exhaust tube or pipe 16. The tube 12, if opaque, may be provided at the lower end with a viewing port 17 having an appropriate lens or viewing plate therein, made of quartz, for example. This provides for visual monitoring of the pyrolysis at this point.

As shown in FIG. 2, injector assembly 14 comprises a housing generally indicated at 18 having a suitable attachment means such as flange 19, which is secured to tube 12 by bolts or the like (not shown). Centrally located within the injector assembly 14 is a gas delivery tube or pipe 21 terminating at the lower end in a nozzle 22 and adapted to be connected to a controlled supply or source (not shown) of material (a hydrocarbon and carrier gas) to be chemically decomposed in heated tube 12 for producing small carbon particles. An annular member 20 is positioned about delivery tube 21 and defines an annular passage 23 therebetween which is in communication with an air inlet tube 24 (see FIG. 3) connected to an air supply control means (not shown). A cooling jacket 25 forming the walls of housing 18 and defining an annular cooling chamber 26 is positioned in surrounding relation about annular member 20. Water or other coolant is supplied to the cooling chamber 26 through an inlet tube 27 mounted in cooling jacket 25, which is attached to a tube 28 positioned within chamber 26 for delivery of the water or other coolant to the bottom of cooling jacket 25. Inlet tube 27 is adapted to be connected to a controlled supply (not shown) of cooling material, such as water, which is directed through cooling chamber 26 and out via an outlet tube 29 mounted in the upper portion of cooling jacket 25.

In operation, a premixed, dilute mixture of a selected hydrocarbon and carrier gas, such as acetylene and argon (typically 1 part acetylene to 8 parts argon by volume), is passed through delivery tube 21, nozzle 22 and into the heated reaction tube 12. The delivery tube 21, particularly nozzle 22, is kept cold by circulating coolant, such as water, through cooling chamber 26 via inlet and outlet tubes 27, 28 and 29. Air is added, as desired to improve the pyrolysis process, through tube 24 and annular passage 23. While not shown, delivery tube 21 may be provided with means, such as an elongated screw thread adjacent nozzle 22, to keep tube 21 centered in annular member 20 and to assist in heat transfer from the nozzle 22 to the coolant in chamber 26.

The elongated reaction tube 12 is heated by heating unit 13 from a zone starting at the entry of the mixture from nozzle 22 and terminating about half way down the tube. After that point, the pyrolysis reaction keeps the mixture hot and the final tube length is insulated, as required for temperature control. The pyrolysis temperature for the acetylene-argon mixture is between about 800°–1000° C., with a preferred temperature of about 925° C. The cooled nozzle 22 prevents carbon build-up at the tip thereof.

By way of example, the elongated tube 12 may be constructed of stainless steel with a length of 70 inches and diameter of 3 inches, with about 30–35 inches heated and about 35–40 inches insulated. Quartz window 17 may have a diameter of two inches. Injector assembly housing 18 and delivery tube 21 may be constructed of stainless steel or other material compatible with the mixture flowing through tube 21 and the pyrolysis reaction adjacent nozzle 22. The insulation about reaction tube 12 may be about 2 inches of high temperature refractory fiber insulation. Also, by way of example, with a premixed, dilute mixture of acetylene and argon, as described above, passing through delivery tube 21 at the rate of 120 liters/min, air may be directed through passage 23 at the rate of about 0.02 l/min to 0.08 l/m, and nozzle 22 retained by coolant at a temperature of about 50° to 150° C., and with a pyrolysis temperature of about 925° C., a carbon particle mass flow rate of 34.2 mg/sec. results.

The bottom end of reaction tube 12 is sealed off and the particle exhaust tube 16 is located about 4 inches, for example, above the bottom of tube 12. This provides a trap for agglomerated carbon particles should any be generated. The exhaust tube 16 may be about 2 inches in diameter and connected to a flexible tubing via a conical adapter for passing the particles to a point of use.

Tests conducted with a particle generator constructed similar to that described and illustrated herein are set forth in report LBL-13755, "The Design and Construction of A High Temperature Gas Receiver Utilizing Small Particles As The Heat Exchanger (SPHER)", by A. J. Hunt, Lawrence Berkeley Laboratory, University of Calif.

It has thus been shown that the present invention provides a method and apparatus for rapidly producing small carbon particles while minimizing agglomeration of the particles.

While the hydrocarbon feed and carrier gas of the above description are exemplified as acetylene and argon, other materials can be used.

As known in the art, carbon blacks can be made from any hydrocarbon or carbonaceous material. The operating conditions and/or characteristics however do vary based on feed. Thus, while any carbonaceous matter can be used to make non-agglomerating blacks of high surface area and of small particle size, in the present process the preferred feeds are saturated and unsaturated hydrocarbons which are gases (or dense vapors) at normal ambient conditions (i.e. about 20°–25° C./1 atmos.). Most preferred is acetylene although ethylene, propylene, propane, butane and pentane can be used as the hydrocarbon feed.

The carrier gas, is preferably an inert gas such as argon, helium and neon, or mixtures thereof.

While a particular embodiment of the invention has been illustrated and described, modifications will become apparent to those skilled in the art, and it is intended to cover in the appended claims all such modifications as come within the scope of the invention.

What is claimed:

1. A method for producing carbon particles having a diameter in the range of about 0.01 to about 0.5 micrometers by the pyrolysis of a dilute mixture of a hydrocarbon and an inert carrier gas with minimum agglomeration of the particles, comprising the steps of:
    directing the dilute mixture having a ratio of about 1 part hydrocarbon to about 8 parts carrier gas through a nozzle into an upper portion of a heated elongated reaction chamber,
    cooling the nozzle to a temperature of about 50° to 150° C. such that the mixture is cool upon entering the heated reaction chamber,
    controlling the temperature of the reaction chamber in a range of about 800°–1000° C. so as to result in pyrolysis of at least a portion of the mixture thereby forming carbon particles while substantially minimizing agglomeration thereof, and
    directing the thus formed particles out of a lower portion of the reaction chamber.

2. The method of claim 1 additionally including the step of premixing the dilute mixture.

3. The method of claim 1 additionally including the step of forming the dilute mixture from acetylene and argon.

4. The method of claim 3, wherein the acetylene and argon are mixed in a ratio of about 1 part acetylene to about 8 parts argon by volume.

5. The method of claim 1, wherein the temperature of the reaction chamber is maintained at about 925° C.

6. The method of claim 1, wherein the step of cooling the nozzle is carried out by directing a flow of coolant thereabout.

7. The method of claim 1 additionally including the step of directing air into the mixture at a point adjacent the nozzle.

* * * * *